United States Patent
Murray et al.

[11] Patent Number: 5,870,631
[45] Date of Patent: Feb. 9, 1999

[54] SYSTEM FOR OPERATING SYSTEM SOFTWARE PROVIDING INPUT BUFFER FOR RECEIVING VARIABLE-LENGTH BIT STREAM WITH A HEADER CONTAINING SYNCHRONIZATION DATA RECOGNIZED BY UNIVERSAL SERIAL CONTROLLER

[75] Inventors: Christopher Stephen Murray, Boynton Beach; Sonya Tyler Long, Coral Springs, both of Fla.

[73] Assignee: International Business Machines Corporation, Armonk, N.Y.

[21] Appl. No.: 573,008

[22] Filed: Dec. 15, 1995

[51] Int. Cl.[6] .................................................. G06F 9/312
[52] U.S. Cl. .......................................................... 395/892
[58] Field of Search ........................... 341/67; 361/222.2, 361/240.8; 370/476; 395/200.01

[56] References Cited

U.S. PATENT DOCUMENTS

| | | | |
|---|---|---|---|
| 3,701,111 | 10/1972 | Cocke et al | 340/172.5 |
| 3,873,920 | 3/1975 | Apple et al. | 325/41 |
| 4,344,132 | 8/1982 | Dixon et al. | 395/880 |
| 4,616,211 | 10/1986 | Ross et al. | |
| 4,623,997 | 11/1986 | Tulpule | 711/141 |
| 4,692,859 | 9/1987 | Ott | 340/825.65 |
| 4,701,913 | 10/1987 | Nelson | 370/522 |
| 4,727,537 | 2/1988 | Nichols | 370/236 |
| 4,823,305 | 4/1989 | Holdren et al. | 395/850 |
| 4,885,538 | 12/1989 | Hoenniger, III et al. | 324/312 |
| 4,885,584 | 12/1989 | Dalrymple | 341/101 |
| 4,914,675 | 4/1990 | Fedele . | |
| 4,942,553 | 7/1990 | Dalrymple et al. | 395/250 |
| 5,179,661 | 1/1993 | Copeland, III et al. | 395/250 |
| 5,208,593 | 5/1993 | Tong et al. . | |
| 5,220,325 | 6/1993 | Acklandetal . | |
| 5,278,956 | 1/1994 | Thomsen et al. | 395/250 |
| 5,363,097 | 11/1994 | Jan . | |
| 5,367,643 | 11/1994 | Chang et al. | 395/325 |
| 5,377,184 | 12/1994 | Beal et al. | 370/24 |
| 5,388,237 | 2/1995 | Sodos | 395/425 |
| 5,392,209 | 2/1995 | Eason et al. | 707/3 |
| 5,394,144 | 2/1995 | Kim . | |
| 5,406,554 | 4/1995 | Parry | 370/58.1 |
| 5,422,879 | 6/1995 | Parsons et al. | 370/236 |
| 5,440,690 | 8/1995 | Rege et al. | 395/200.8 |
| 5,519,701 | 5/1996 | Colmant et al. | 370/60.1 |
| 5,608,889 | 3/1997 | Werlinger et al. | 395/421.07 |
| 5,615,392 | 3/1997 | Harrison et al. | 395/876 |
| 5,687,392 | 11/1997 | Radko | 395/842 |
| 5,740,467 | 4/1998 | Chmielecki, Jr. et al. | 395/876 |

*Primary Examiner*—Thomas C. Lee
*Assistant Examiner*—Anderson I. Chen
*Attorney, Agent, or Firm*—Gunster, Yoakley, Valdes-Fauli & Stewart

[57] ABSTRACT

A method and apparatus for communicating between two, or more, devices receiving a variable-length bit stream. The method and apparatus allocate an input buffer larger than any read size selected for the receiving unit and the reception stops when the input buffer is full.

3 Claims, 3 Drawing Sheets

| DATA PORTION | HEADER |
|---|---|
| 1 TO N | 5 TO 8 BITS FOR SYNC. |

SYSTEM FOR OPERATING SYSTEM SOFTWARE PROVIDING INPUT BUFFER FOR RECEIVING VARIABLE-LENGTH BIT STREAM WITH A HEADER CONTAINING SYNCHRONIZATION DATA RECOGNIZED BY UNIVERSAL SERIAL CONTROLLER

BACKGROUND OF THE INVENTION

1. Field of the Invention

This invention relates generally to communication protocols and more specifically to a communication protocol for communication between devices that do not recognize bit or character oriented protocols.

2. Background of the Invention

Some communication systems use bit and character oriented protocols which use a standard method for transmitting and receiving data. These protocols also use a standard method for recognizing the end of a receive frame. In other communication systems there are many devices that transmit or receive variable length bit streams. Some of these devices are unable to recognize bit or character oriented protocols. In such communication systems data is sent from a transmitting device in variable-length bit streams. These bit streams do not include parity, frame check sequence, or bit boundaries. At the receiving end, the amount of data to be received is unknown. There is no trailing character in the bit stream to denote the end of the stream. There is a maximum boundary of the data format being sent.

In a prior system, a sending device drops a control signal and the receiving device terminates a read on a change in the control signal. This method has the disadvantage that control signals are required to denote the termination of the received bit streams and some communication systems lack such control signals.

SUMMARY OF THE INVENTION

Briefly, in accordance with the invention, a method for communicating between two, or more, devices comprises the steps of (1) receiving a variable-length bit stream, (2) decoding a predetermined number of bits in the variable-length bit stream to synchronize on the predetermined number of bits, using the predetermined number of bits as a synchronization character, (3) allocating an input buffer larger than any read size selected; and (4) stopping reception when the input buffer is full. Thus, the length of a message is determined by use of the buffer.

DESCRIPTION OF THE PREFERRED EMBODIMENT

Figure 1:
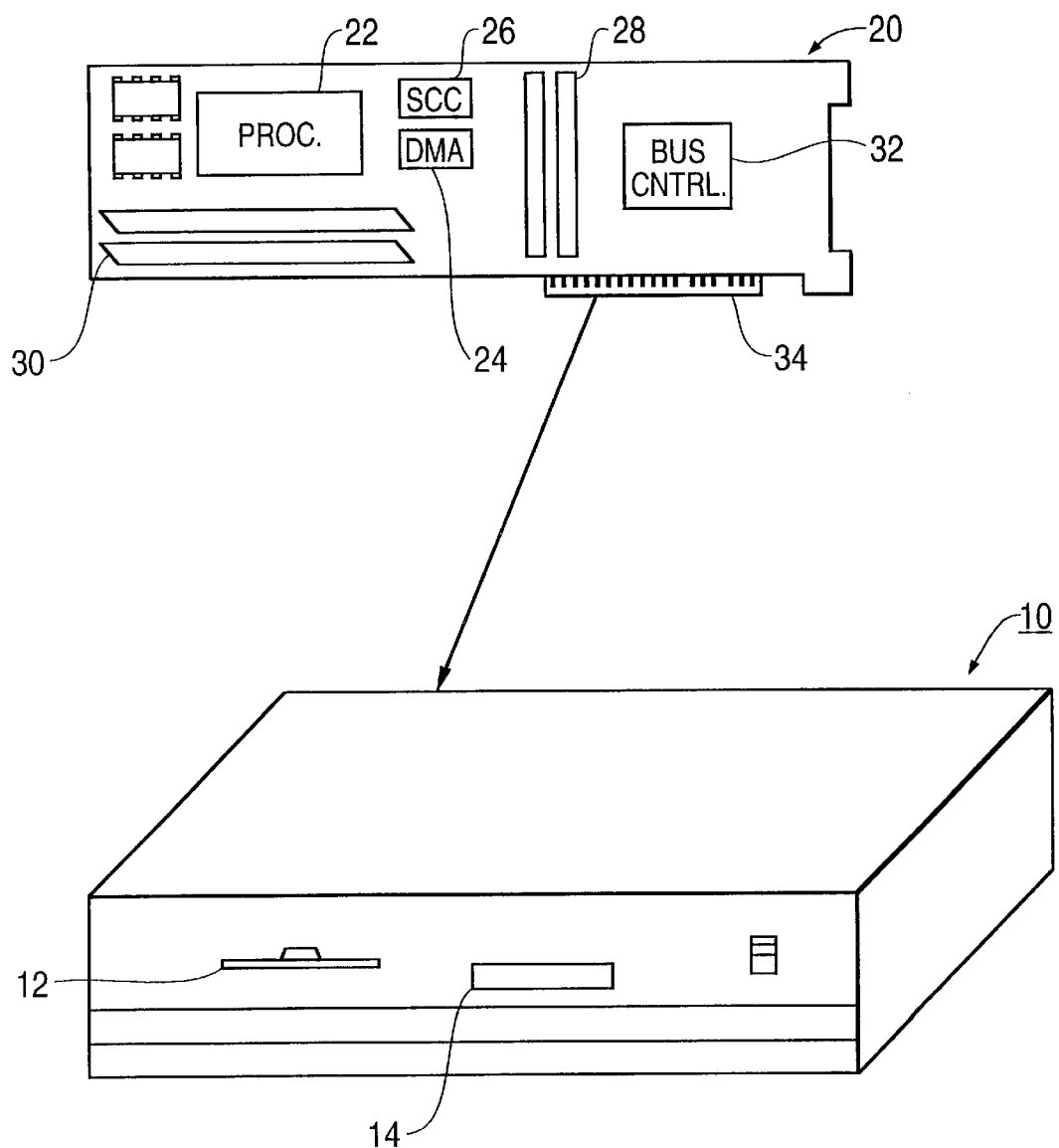
FIG. 1 shows a computer system unit and a communication subsystem in accordance with the invention.

Referring to FIG. 1, there is shown a conventional personal computer (pc) system unit 10 and a communication adapter 20 using a protocol in accordance with the invention.

The pc unit 10 includes a diskette drive 12, a CD ROM drive 14, and a fixed disk drive (not shown) for providing mass information storage capability to the system.

The adapter 20 is a communication subsystem that is connectable to an expansion slot in the pc unit 10 for coupling the system unit 10 to a communication network. The adapter is, in a sense, a computer within a computer and contains sufficient circuitry to offload the communication function from the central processor unit (cpu) of the system 10. Thus, the adapter 20 includes a processor 22, a serial communication controller (SCC) 26, a direct memory access (DMA) controller 24, a bus controller 32, memory modules 30, and expansion slots 28. A connector 34 couples to an expansion slot on the motherboard of the system unit 10. The connector 34 can be designed in accordance with any of several expansion bus types such as Industry Standard Architecture (ISA) or Microchannel (a trademark of International Business Machines corporation).

Figure 2:
FIG. 2 shows a data packet in accordance with one aspect of the invention.

Referring to FIG. 2, there is shown a data packet for use with a protocol in accordance with the invention. The packet comprises a data portion and a header portion. The data portion represents the message being transmitted and is one to N bits in length. The header portion comprises synchronization information and is five to eight bits long. The synchronization bits may change for every frame and are variable in length, as is the frame. As discussed before, the length of the data portion is not known to the unit receiving the data because nothing in the packet indicates its length.

The system 10 can be used as part of a communication system or network by coupling the communication adapter 20 to the system 10. The adapter 20 can be programmed to communicate with other devices in its network in accordance with a protocol according to the invention. The subject protocol uses a buffer having a predetermined length that is calculated to be the maximum size for any packet of data received from other devices. Thus, when the incoming data fill up the buffer it is known that the length of the data packet is the length of the buffer. This buffer can be implemented by using a DMA counter (i.e., a DMA controller programmed to perform as a down counter).

Figure 3:
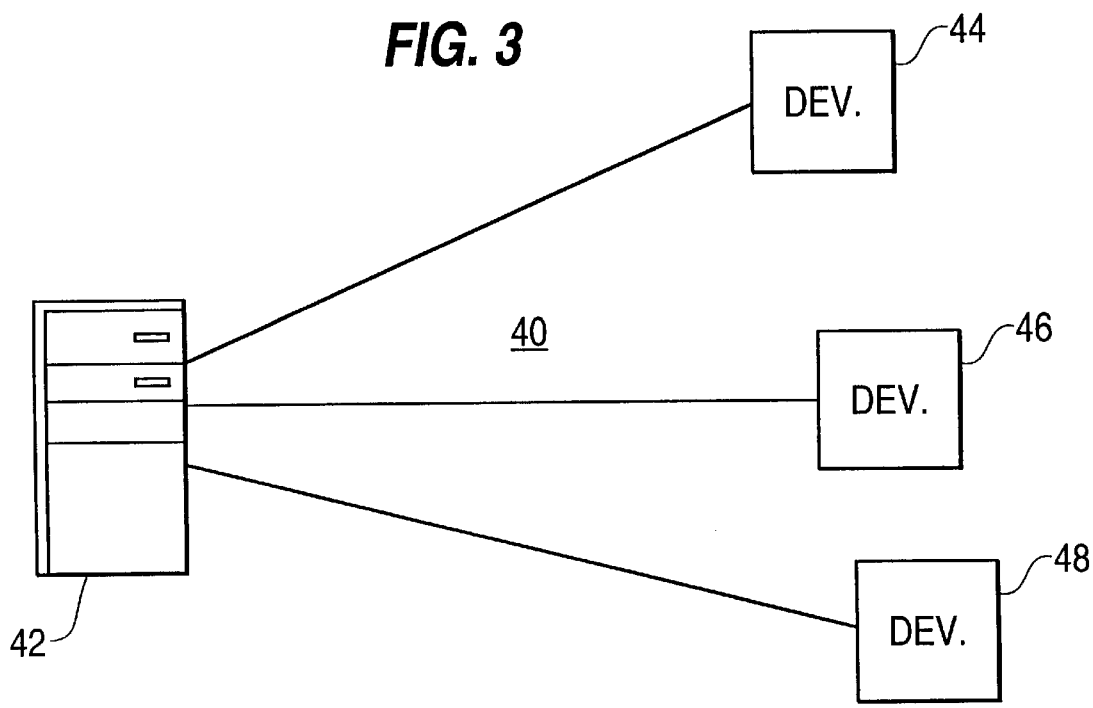
FIG. 3 shows a communication system comprising a computer unit and a plurality of devices coupled to the computer.

Referring to FIG. 3, there is shown a communication system 40 comprising a computer unit 42 and a plurality of devices (44–46) coupled to the computer 42. A communication subsystem, such as adapter 20, can be coupled to the computer 42 to provide operation in accordance with the invention. These devices represent a plurality of communication devices that may be used in a practical implementation of the invention. Assume that device 44 is an old device used to measure data and to transmit that data to another unit. In this system also assume that device 44 transmits variable-length bit streams having no parity, frame check sequence, or bit boundary. The receiving device (e.g., unit 42) receives the variable-length bit stream, decodes a predetermined number of bits (e.g., seven bits) in the variable-length bit stream to synchronize on the predetermined number of bits, using the predetermined number of bits as a synchronization character. The communication adapter 20 can be programmed to establish a buffer having a predetermined size. The predetermined size is calculated to be longer than any read size selected. The unit 42 performs a read operation of the unit 44. As stated above, the length of the data transmitted by the device 44 is variable, and the transmitted packet lacks any indication of its length. In accordance with the invention, the receiving unit 42 determines the length of the transmission by the length of the buffer. Therefore, the unit 42 now has the capability to interpret the data transmitted by the unit 44 without the need to re-format the data.

Figure 4:
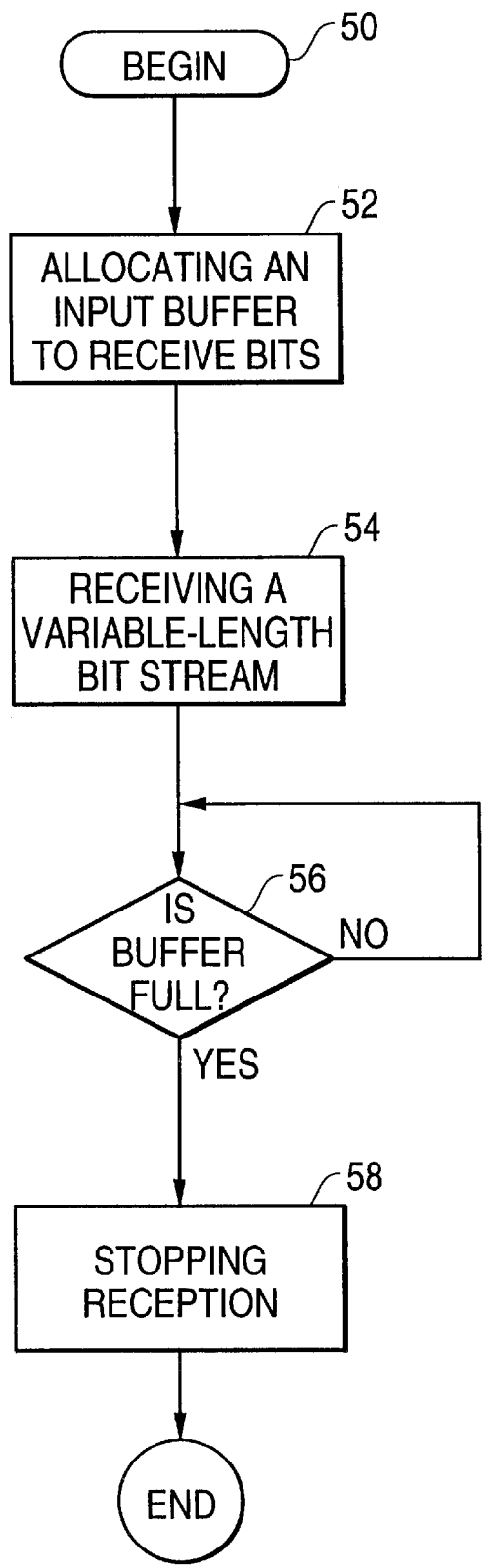
FIG. 4, shows a flow chart representing a method for communicating between two, or more, devices in accordance with the invention.

Referring to FIG. 4, there is shown a flow chart representing a method for communicating between two, or more, devices comprising the following steps. The process begins at step 50. Step 52 comprises allocating an input buffer larger than any read size selected for a unit receiving the bit stream. Step 54 comprises receiving a variable-length bit stream. The bit stream comprising at least one data packet having a header portion containing synchronization data. Step 56 comprises determining whether the input buffer is full. Step 58 comprises stopping reception when the input buffer is full.

The step of receiving a variable-length bit stream can be done by programming the universal serial communication controller 26 (shown in FIG. 1) to recognize the bit stream. Step 54 can be implemented by allocating an input buffer that comprises programming operating system software to provide system memory space for the input buffer. The step of stopping reception (58) comprises using a terminal count interrupt signal to determine that the input buffer is full. This method can be implemented with the communication adapter 20 shown in FIG. 1.

What is claimed is:

1. A method for communicating between two, or more, devices comprising the steps of:

programming a universal serial communication controller to recognize an incoming bit stream:

receiving a variable-length bit stream, the bit stream comprising at least one data packet having a header portion containing synchronization data;

allocating an input buffer larger than any read size selected for a device receiving the bit stream;

programming operating system software to provide system memory space for the input buffer; and using a terminal count interrupt signal to determine that the input buffer is full and stopping reception when the input buffer is full.

2. A computer system comprising:

means for receiving variable-length bit streams, each bit stream comprising at least one data packet having a header portion containing synchronization data and at least some of the bit streams lack an indication of bit stream length;

means for allocating an input buffer larger than any read size selected; and means for stopping reception when the input buffer is full;

and wherein:

the means for receiving a variable-length bit stream comprises a universal serial communication controller programmed to recognize the bit stream;

the means for allocating an input buffer comprises operating system software programmed to provide system memory space for the input buffer;

the means for stopping reception comprises a terminal count interrupt signal programmed to determine that the input buffer is full.

3. A communication adapter for a computer comprising:

means for receiving variable-length bit streams, each bit stream comprising at least one data packet having a header portion containing synchronization data and at least some of which lack an indication of bit stream length;

means for allocating an input buffer larger than any read size selected; and means for stopping reception when the input buffer is full and wherein:

the means for receiving a variable-length bit stream comprises a universal serial communication controller programmed to recognize the bit stream;

the means for allocating an input buffer comprises operating system software programmed to provide system memory space for the input buffer;

the means for stopping reception comprises a terminal count interrupt signal programmed to determine that the input buffer is full.

* * * * *